United States Patent
Khalid et al.

(10) Patent No.: US 11,210,390 B1
(45) Date of Patent: Dec. 28, 2021

(54) MULTI-VERSION APPLICATION SUPPORT AND REGISTRATION WITHIN A SINGLE OPERATING SYSTEM ENVIRONMENT

(71) Applicant: FireEye, Inc., Milpitas, CA (US)

(72) Inventors: Yasir Khalid, Fremont, CA (US); Muhammad Amin, San Francisco, CA (US); Emily Jing, Fremont, CA (US); Muhammad Rizwan, Singapore (SG)

(73) Assignee: FireEye Security Holdings US LLC, Milpitas, CA (US)

( * ) Notice: Subject to any disclaimer, the term of this patent is extended or adjusted under 35 U.S.C. 154(b) by 0 days.

(21) Appl. No.: 16/036,873

(22) Filed: Jul. 16, 2018

Related U.S. Application Data

(63) Continuation of application No. 15/489,665, filed on Apr. 17, 2017, now Pat. No. 10,025,927, which is a
(Continued)

(51) Int. Cl.
*G06F 21/53* (2013.01)
*G06F 21/56* (2013.01)
(Continued)

(52) U.S. Cl.
CPC .......... *G06F 21/53* (2013.01); *G06F 9/45558* (2013.01); *G06F 21/556* (2013.01);
(Continued)

(58) Field of Classification Search
CPC ...... G06F 21/53; G06F 21/556; G06F 21/564; G06F 9/45558; G06F 2009/45587; G06F 2009/45575
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

A. Nguyen et al. MAVMM: Lightweight and Purpose Built VMM for Malware Analysis. 2009 Annual Computer Security Applications Conference. pp. 441-450. (Year: 2009).*

(Continued)

*Primary Examiner* — Robert B Leung
(74) *Attorney, Agent, or Firm* — Rutan & Tucker, LLP

(57) ABSTRACT

Techniques for efficient malicious content detection in plural versions of a software application are described. According to one embodiment, the computerized method includes installing a plurality of different versions of a software application concurrently within a virtual machine and selecting a subset of the plurality of versions of the software application that are concurrently installed within the virtual machine. Next, one or more software application versions of the subset of the plurality of versions of the software application are processed to access a potentially malicious content suspect within the virtual machine, without switching to another virtual machine. The behaviors of the potentially malicious content suspect during processing by the one or more software application versions are monitored to detect behaviors associated with a malicious attack. Thereafter, information associated with the detected behaviors pertaining to a malicious attack is stored, and an alert with respect to the malicious attack is issued.

22 Claims, 4 Drawing Sheets

Related U.S. Application Data continuation of application No. 13/801,557, filed on Mar. 13, 2013, now Pat. No. 9,626,509.

(51) Int. Cl.
*G06F 21/55* (2013.01)
*G06F 9/455* (2018.01)

(52) U.S. Cl.
CPC .......... *G06F 21/564* (2013.01); *G06F 21/566* (2013.01); *G06F 2009/45575* (2013.01); *G06F 2009/45587* (2013.01); *G06F 2009/45591* (2013.01)

(56) References Cited

U.S. PATENT DOCUMENTS

| | | | |
|---|---|---|---|
| 5,319,776 A | 6/1994 | Hile et al. | |
| 5,440,723 A | 8/1995 | Arnold et al. | |
| 5,490,249 A | 2/1996 | Miller | |
| 5,603,027 A | 2/1997 | Ohkami | |
| 5,657,473 A | 8/1997 | Killean et al. | |
| 5,802,277 A | 9/1998 | Cowlard | |
| 5,842,002 A | 11/1998 | Schnurer et al. | |
| 5,960,170 A | 9/1999 | Chen et al. | |
| 5,978,917 A | 11/1999 | Chi | |
| 5,983,348 A | 11/1999 | Ji | |
| 6,088,803 A | 7/2000 | Tso et al. | |
| 6,092,194 A | 7/2000 | Touboul | |
| 6,094,677 A | 7/2000 | Capek et al. | |
| 6,108,799 A | 8/2000 | Boulay et al. | |
| 6,118,382 A | 9/2000 | Hibbs et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,417,774 B1 | 7/2002 | Hibbs et al. | |
| 6,424,627 B1 | 7/2002 | Sorhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,700,497 B2 | 3/2004 | Hibbs et al. | |
| 6,725,453 B1 * | 4/2004 | Lucas ..................... | G06F 8/65 717/173 |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,981,279 B1 * | 12/2005 | Arnold .................. | G06F 21/566 703/27 |
| 6,995,665 B2 | 2/2006 | Appelt et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,273 B1 * | 4/2011 | Clark ..................... | G06F 8/71 707/638 |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |

(56) References Cited

U.S. PATENT DOCUMENTS

| | | | |
|---|---|---|---|
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,756,696 B1 * | 6/2014 | Miller .................. H04L 63/14 709/247 |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,092,625 B1 * | 7/2015 | Kashyap .................. G06F 21/566 |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,117,079 B1 | 8/2015 | Huang et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |

(56) References Cited

U.S. PATENT DOCUMENTS

| | | |
|---|---|---|
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |

(56) References Cited

U.S. PATENT DOCUMENTS

| | | |
|---|---|---|
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144342 A1* | 6/2009 | Sudhakar ............ G06F 16/1873 |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Ståhlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |

(56) References Cited

U.S. PATENT DOCUMENTS

| | | |
|---|---|---|
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

(56) References Cited

OTHER PUBLICATIONS

AltaVista Advanced Search Results. "attack vector identifier". Http://www.altavista.com/web/results?ltag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?ltag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric, et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware"", Security and Privacy in Communication Networks. Springer Berlin Heidelberg, 2010. 20-34.

(56) References Cited

OTHER PUBLICATIONS

Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 13/801,557, filed Mar. 13, 2013 Final Office Action dated May 28, 2015.
U.S. Appl. No. 13/801,557, filed Mar. 13, 2013 Non-Final Office Action dated Feb. 5, 2016.
U.S. Appl. No. 13/801,557, filed Mar. 13, 2013 Non-Final Office Action dated Nov. 17, 2014.
U.S. Appl. No. 15/489,665, filed Apr. 17, 2017 Non-Final Office Action dated Aug. 11, 2017.
U.S. Appl. No. 15/489,665, filed Apr. 17, 2017 Notice of Allowance dated Feb. 12, 2018.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub--mining.pdf-.
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
U.S. Appl. No. 13/801,557, filed Mar. 13, 2013 Advisory Action dated Sep. 11, 2015.
U.S. Appl. No. 13/801,557, filed Mar. 13, 2013 Notice of Allowance dated Dec. 7, 2016.
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

\* cited by examiner

MULTI-VERSION APPLICATION SUPPORT AND REGISTRATION WITHIN A SINGLE OPERATING SYSTEM ENVIRONMENT

CROSS-REFERENCE TO RELATED APPLICATIONS

This application is a continuation of U.S. patent application No. U.S. patent application Ser. No. 15/489,665, filed on Apr. 17, 2017, now U.S. Pat. No. 10,025,927 issued Jul. 17, 2018, which is a continuation of U.S. patent application Ser. No. 13/801,557, filed on Mar. 13, 2013, now U.S. Pat. No. 9,626,509, issued on Apr. 18, 2017, the entire contents of which are incorporated by reference herein

FIELD OF THE INVENTION

Embodiments of the present invention relate generally to malicious content detection. More particularly, embodiments of the invention relate to performing a malicious content analysis using multiple versions of a software application associated with the malicious content suspect within a single operating environment.

BACKGROUND

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to an HTTP standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a portable document format (PDF) document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs). Such solutions monitor the behavior of content during execution to detect anomalies that may signal the presence of malware. One such system offered by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine. The results of the analysis aids in determining whether the file is malicious. The two-phase malware detection solution may detect numerous types of malware and, even malware missed by other commercially available approaches. Through verification, the two-phase malware detection solution may also achieve a significant reduction of false positives relative to such other commercially available approaches. Dealing with false positives in malware detection may needlessly slow or interfere with download of network content or receipt of email, for example. This two-phase approach has even proven successful against many types of polymorphic malware and other forms of advanced persistent threats.

Some of the malicious content, such as a PDF file, may require a software application, such as an Adobe® Acrobat™ reader, to process (e.g., open or load in memory) in order to exhibit anomalous behavior indicative of malware and, in the real world, cause damage to a data processing system. Typically, in order to test for malware, the aforementioned two-phase malware detection system uses a single instance of the software application within the virtual environment. The VM has to be launched, tested, and terminated for the purpose of testing the potentially malicious content with the software application. It may take a relatively long time to launch and terminate a VM. In addition, in a data processing system, there is a limited number of VMs that can be concurrently launched because of limited resources (e.g., processor cores, memory). When a VM is scheduled, the potentially malicious content may be put in a pending queue until the necessary resources become available (e.g., another VM terminated). As a result, heavy workloads in terms of the number of potentially malicious content to be tested and VM instances needed for testing can tax system resources and cause undesirable test latencies.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
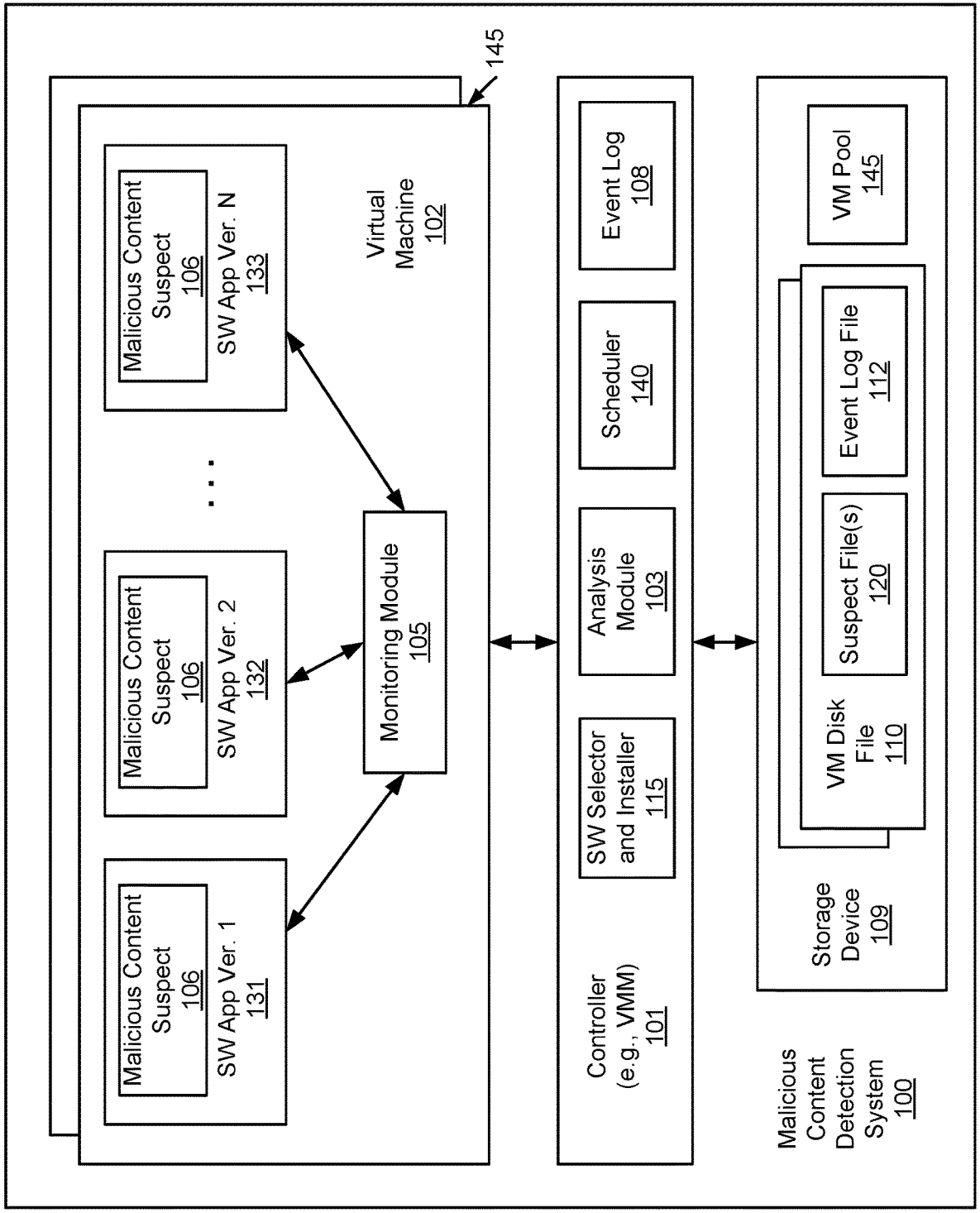
FIG. 1 is a block diagram illustrating a malicious content detection system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for efficient and effective malicious content detection using plural versions of a software application are described herein. More specifically, embodiments of the invention obtain the advantages of testing across plural versions of a software application within a single operating environment required for cyber-attack analysis of a content suspect for identification of malware. With this approach, if any of the utilized versions of the software application have exploit vulnerabilities to the particular attack vector, it may be concluded that the content suspect contains malware.

A software application may be released in plural versions at least one of which may be susceptible to being infected by the malicious content while one or more of the others may not. As noted above, typically, the known two-phase malware detection systems only test with a single version of a software application. If the test is conducted with the version of the software application having the susceptibility, the test may then indicate that susceptibility for that version. If more than one version of the software application is executed, one after another, to test the same content suspect, testing resources and time may be unduly spent. On the other hand, if the testing is conducted on the content suspect using the single version of the software application, it may yield a false negative with respect to all other versions, since it is possible that only the version selected for use in the test is free of susceptibility to the particular attack. The testing across plural or even all versions of a software application may thus identify anomalous behavior linked to malware that would be missed using a more limited test protocol.

According to some embodiments, plural versions of a software application are preferably concurrently installed and maintained within a single VM. As used herein, "concurrent" indicates temporal overlap during testing. For example, if a particular software application is available in a number (greater than one), e.g., 10, different versions, all versions may be tested at the same time in the same VM, or, of course, a subset (e.g., five) may be tested in each of a limited number (e.g., two) of VMs, preferably less than the total number of versions to be tested. Continuing the former example, when the VM is launched, the 10 versions of the software application can be tested within the same VM without having to switch to and execute another VM. That is, processing logic does not have to terminate a current VM configured to test one version of the software application and launch another VM in order to test another version of the software application. In addition, since a single VM can be utilized to test multiple versions of a software application, the number of VMs required can be greatly reduced. As a result, the resources and time to schedule and maintain the VMs can also be reduced.

FIG. 1 is a block diagram illustrating a malicious content detection system according to one embodiment of the invention. Referring to FIG. 1, system 100 includes controller 101 to manage or control one or more virtual machines (VMs) 102 (also referred to as a sandboxed operating environment or simply a sandbox), where content associated with VMs 102 are stored in storage device 109 in a form of VM disk files 110.

Controller 101 may be implemented as part of a VM monitor or manager (VMM), also referred to as a hypervisor for managing or monitoring VMs, which may be hosted by a host operating system (OS). VM 102 may be hosted by a guest OS. The host OS and the guest OS may be the same type of operating systems or different types of operating systems (e.g., Windows™, Linux™, Unix™, Mac OS™, iOS™, etc.), or different versions thereof. A VM is a simulation of a machine (abstract or real) that is usually different from the target machine (where it is being simulated on). Virtual machines may be based on specifications of a hypothetical computer or emulate the computer architecture and functions of a real world computer. A virtual machine referred to herein can be any type of virtual machines, such as, for example, hardware emulation, full virtualization, para-virtualization, and operating system-level virtualization virtual machines.

According to one embodiment, when malicious content suspect 106 is received for a dynamic content analysis (as opposed to be a static content analysis described below), a scheduler 140 of controller 101 is configured to identify and select a VM, in this example VM 102, from a VM pool 145 that has been configured to closely simulate a target operating environment (e.g., particular version of an OS with particular version(s) of certain software installed therein) in which malicious content suspect 106 is to be analyzed. The scheduler 140 may include a queue of malicious content suspects waiting for a virtual machine to become available because, under heavy workloads, the number of VMs that may be concurrently executed may be limited. The scheduler 140 then launches VM 102 in which monitoring module 105 is running within VM 102 and configured to monitor activities and behavior of malicious content suspect 106.

In addition, monitoring module 105 maintains a persistent communication channel with analysis module 103 of controller 101 to communicate certain events or activities of malicious content suspect 106 during the execution. In response to detecting certain predetermined events triggered by malicious content suspect 106, monitoring module 105 is configured to send a message via the communication channel to analysis module 103, where the message may be recorded as part of event log 108. The message includes information identifying an event triggered by malicious content suspect 106. Event log 108 records events that have been selectively monitored and detected by monitoring module 103, such as, for example, file creation or file open events. Content of the event log 108 may be stored in a persistent storage as part of event log file(s) 112 of VM disk file 110 associated with VM 102. The recorded events may be analyzed by analysis module 103 based on a set of rules or policies (not shown) to determine whether malicious content suspect 106 is likely malicious.

According to one embodiment, prior to launching VM 102, one or more versions 131-133 of a software (SW) application that is associated with malicious content suspect 106 are installed and configured within VM 102. A SW application may be an Adobe Acrobat™ Reader and malicious content suspect 106 may be a PDF file. Alternatively, a SW application may be a Microsoft Office™ Suite and malicious content suspect 106 may be a WORD document file. Malicious content suspect 106 may include embedded codes or scripts that only exhibit anomalous behavior when the corresponding SW application accesses and loads malicious content suspect 106, including, for example, extracting or downloading suspect files 120 to be stored in the system. Indeed, the malicious content suspect 106 may exhibit the anomalous behavior for only a subset of the versions available for a SW application. This may be due to a security vulnerability (e.g., a programmatic feature susceptible to exploit) existing only in the subset of versions, which may occur, for example, when other versions have eliminated that feature or have been patched previously to close that security vulnerability. Accordingly, successfully detecting anomalous behavior marking a malicious attack may depend on the selection of the version or versions of the SW application to be used in testing conducted by the malicious content detection system 100. To that end, the controller 101 may further comprise a software selector and installer ("SSI") 115. The SSI 115 selects one or more versions of a software application to be used in testing. For example, the SSI 115 may select a single software application version or plural versions in response to user input, where a user may be any individual such as a system administrator or a forensic specialist or other entity to equip to provide such input.

In one embodiment, the SSI 115 may determine a software profile best suitable for testing the malicious content suspect 106. The software profile may comprise the operating system (e.g., Windows™, Linux™), in a particular version, and a suitable software application, in a particular version, to simulate or mimic a particular digital device that runs those versions, in order to test whether that device is safe when processing the malicious content suspect 106. The determination can be based on analysis of the protocol information associated with the malicious content suspect 106. For purposes hereof, "version" shall include versioning of the software at any level, from new release through service packs (SPs). In an example, the SSI 115 determines that the software profile of network data is Windows® operating system, version Windows 7™, SP1 running Adobe Acrobat™ Reader X, version 10.1.4.

In other embodiments the SSI 115 may select a flight of different software application versions to enable the malicious content detection system 100 to detect anomalous behavior marking a malicious attack, for example, utilizing any security vulnerability present in any of the selected versions. For example, the selection may be based on an identification of all software application versions used within a particular organization, all commercially available, all available to the malicious content detection system 100, or some subset of any of the above or based on other factors. The decision as to the selection of software application versions may depend on the forensic objectives of the testing. Where the selected versions of the software application are not all compatible with the same operating system or operating system version, the SSI 115 may form groups of one or more the software application versions associated with each of required operating system or operating system version.

Figure 4:
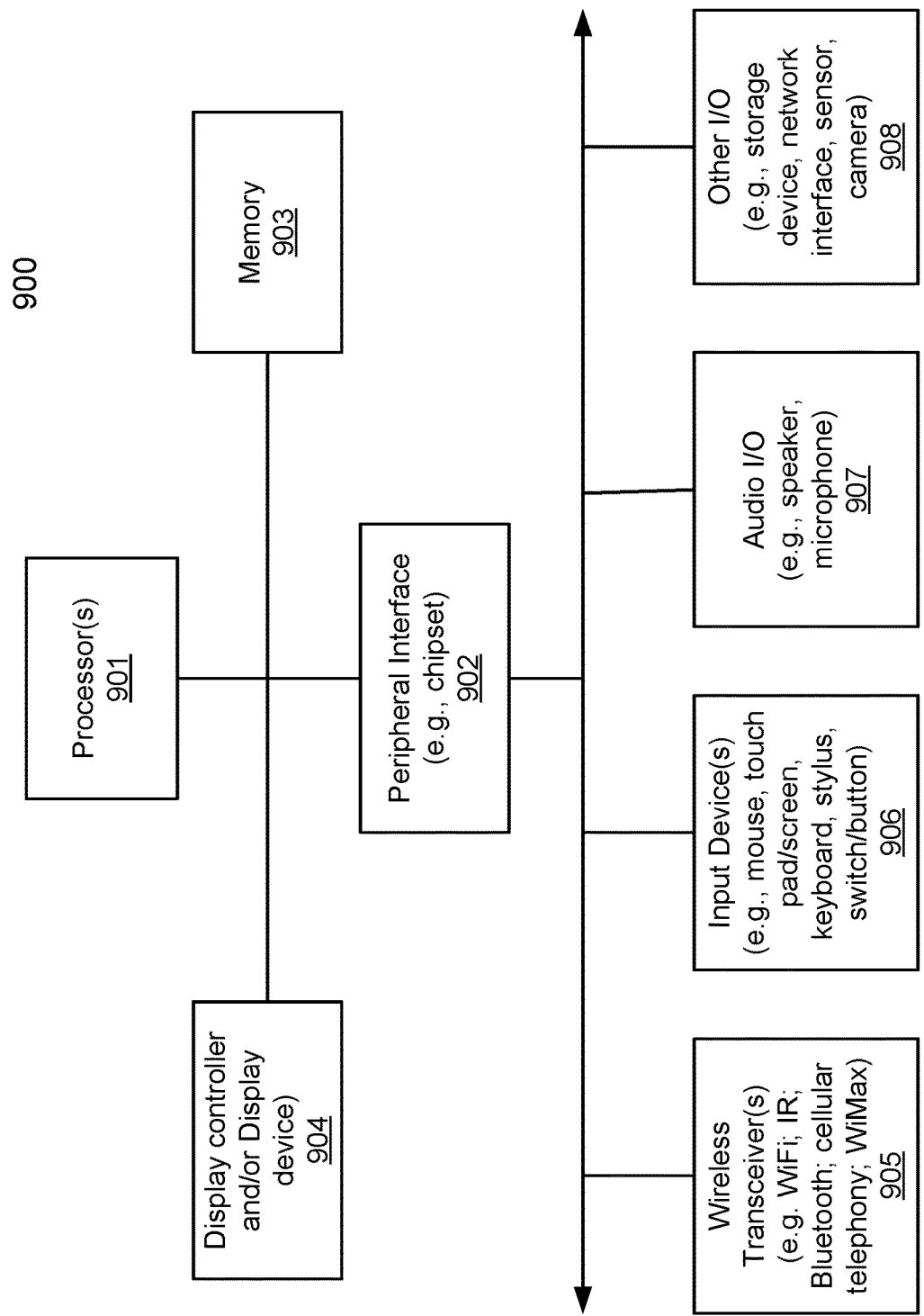
FIG. 4 is a block diagram illustrating an example of a data processing system which may be used with one embodiment of the invention.

The SSI 115 may make the selection of version or versions of the software application in response to a user input entered via an input device 906 (FIG. 4). For example, the input device may allow a user to enter an operating system version and one or more software application versions using a command line interface. In some embodiments, a graphical user interface (GUI) may present a menu of one or more operating system versions along with one or more software application versions compatible with each of the operating system versions so as to allow a user to make an informed decision and selection. The SSI 155 will store the user selection and designate the selection for execution.

In one embodiment, the SSI 115 is responsible for configuring the VM 102 by installing the selected operating system version and software application version or versions in the VM 102. In another embodiment, the SSI 115 can retrieve a pre-configured VM 102 having the selected operating system version and software application version or versions already installed therein. In still another embodiment, the SSI 115 can designate the selected operating system version and software application version or versions for use by the scheduler 140, which is responsible for retrieving and/or configuring the VM 102.

Where the SSI 115 has formed groups of one or more the software application versions associated with each of a plurality of required operating system or operating system version, the SSI 115, or in other embodiments, the scheduler 140, may configure plural VMs 102 selected from a VM pool, each to process a different group of the software application versions on top of the required operating system or operating system version.

In one embodiment, multiple versions of a SW application may be installed by SSI 115 within VM 102 in different directories and/or under different identifiers (e.g., names), such that multiple versions of a single SW application can coexist with a single guest operating system. For example, for a Windows™ operating system, a SW application may be installed in different directories as follows:

C:\Program Files\SW Application\Version 1\. . .
C:\Program Files\SW Application\ Version 2\. . .
C:\Program Files\SW Application\ Version N\. . .

In addition, in the Windows' registry, different versions of the SW application may be registered under different identifiers or names. As a result, the operating system may treat different versions of the same SW application as different programs installed therein. The multiple versions of a software application may be installed by SSI 115 within VM 102 in the different directories and/or under different names as entered by a user, for example, using a command line interface. Alternatively, the SSI 115 may automatically establish the different directories and/or different names in response to user input of the identity of the operating system version and software application version, e.g., using the GUI as described above. Alternatively, multiple versions of a SW application may be installed within the same directory, but registered under different identifiers or names within the operating system. For example, the executables of multiple versions of a SW application and/or their associated libraries can coexist within the same directory with different filenames. The corresponding operating system registry entries would have different links that reference to different filenames.

According to one embodiment, monitoring module 105 launches each of the versions 131-133 to access malicious content suspect 106 within VM 102. For example, monitoring module 105 may launch each of the versions by passing as parameter an identifier (e.g., path/filename) identifying malicious content suspect 106. Monitoring module 105 monitors behavior of the corresponding version of the SW application to determine whether malicious content suspect 106 likely infects that particular version of the SW application. Monitoring module 105 may sequentially launch versions 131-133 of the SW application to access malicious content suspect 106. Alternatively, monitoring module 105 may launch multiple ones of the versions 131-133 and monitor their behaviors concurrently. Single monitoring module 105 may be configured to monitor multiple versions' behavior concurrently. Alternatively, multiple instances of monitoring module 105 may be utilized to concurrently monitor versions 131-133, respectively. Thus, a single VM can be utilized to test multiple versions of a SW application without having to switch to another VM. As a result, the time to schedule and/or launch a VM can be greatly reduced. A number of VMs and resources or bandwidth required to test a malicious content suspect can also be reduced.

According to another embodiment, the techniques described herein can also be utilized to determine whether a malicious content suspect could infect different applications. For example, a PDF file can be loaded by different browser applications (e.g., Internet Explorer™, or Firefox™) that are running within a single guest operating system of a virtual machine. In this example, multiple browser applications may be installed within the same guest operating system. Each of the browser applications can be utilized to open the PDF file and the behavior of the browser application is monitored to determine whether the PDF file likely infects the browser application, without having a need to switch to another virtual machine.

Figure 2:
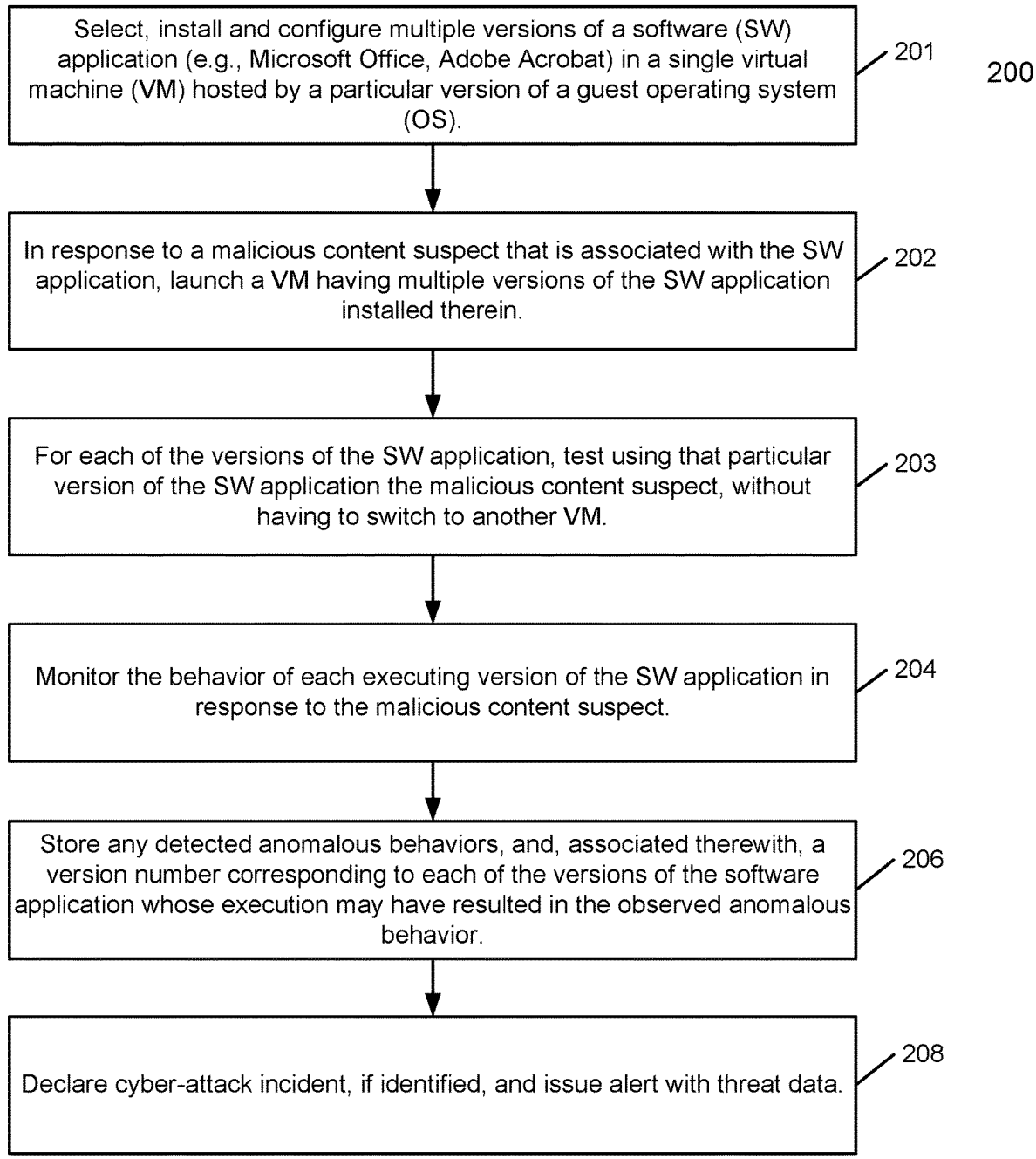
FIG. 2 is a flow diagram illustrating a method for malicious content detection according to one embodiment of the invention.

FIG. 2 is a flow diagram illustrating a method for malicious content detection according to one embodiment of the invention. Method 200 may be performed by system 100 of FIG. 1, which may be implemented as processing logic in software, hardware, or a combination thereof. Referring to FIG. 2, at block 201, processing logic installs and configures multiple versions of a SW application (e.g., Microsoft Office or Adobe Acrobat) within a single VM that is hosted by a guest OS. At block 202, in response to receiving a malicious content suspect associated with the SW application, processing logic identifies and launches a VM having multiple versions of the SW application installed therein. At block 203, for each of the versions of the SW application, processing logic invokes the corresponding version to access and test, preferably concurrently, the malicious content suspect therein. At block 204, processing logic monitors the behavior of the malicious content suspect processed with the corresponding version or versions of the SW application to identify anomalous behavior indicative of a malicious attack. At block 206, the processing logic stores information describing any detected anomalous behaviors, and, associated therewith, the version identifier (e.g., version number and, where applicable, service pack number) corresponding to each of the versions of the software application and the operating system whose execution resulted in the anomalous behavior. At block 208, processing logic declares any identified attack incident and may issue an alert, which in some embodiments, contains or references threat data, including, for example, the version number or numbers of the SW application having a potential security vulnerability so that remedial action may be taken.

For example, if a particular version number of a SW application is found to likely contain a security vulnerability as a result of testing in accordance with embodiments of the invention, it may be recommended that an IT department make a change to a different, existing version of that SW application throughout the organization it serves to prevent future exploits. Since these embodiments of the invention contemplate testing of multiple versions of the SW application, the change of versions may be effected with confidence if the new version selected is one that was tested and found not to have the same security vulnerability. Moreover, the alert may be issued beyond the organization so that other entities may be warned of the security vulnerability. Also, the software vendor may take steps to close the security vulnerability in all affected versions, through patching or issuing of a new, hardened version, with recommendations to its customers to upgrade.

Figure 3:
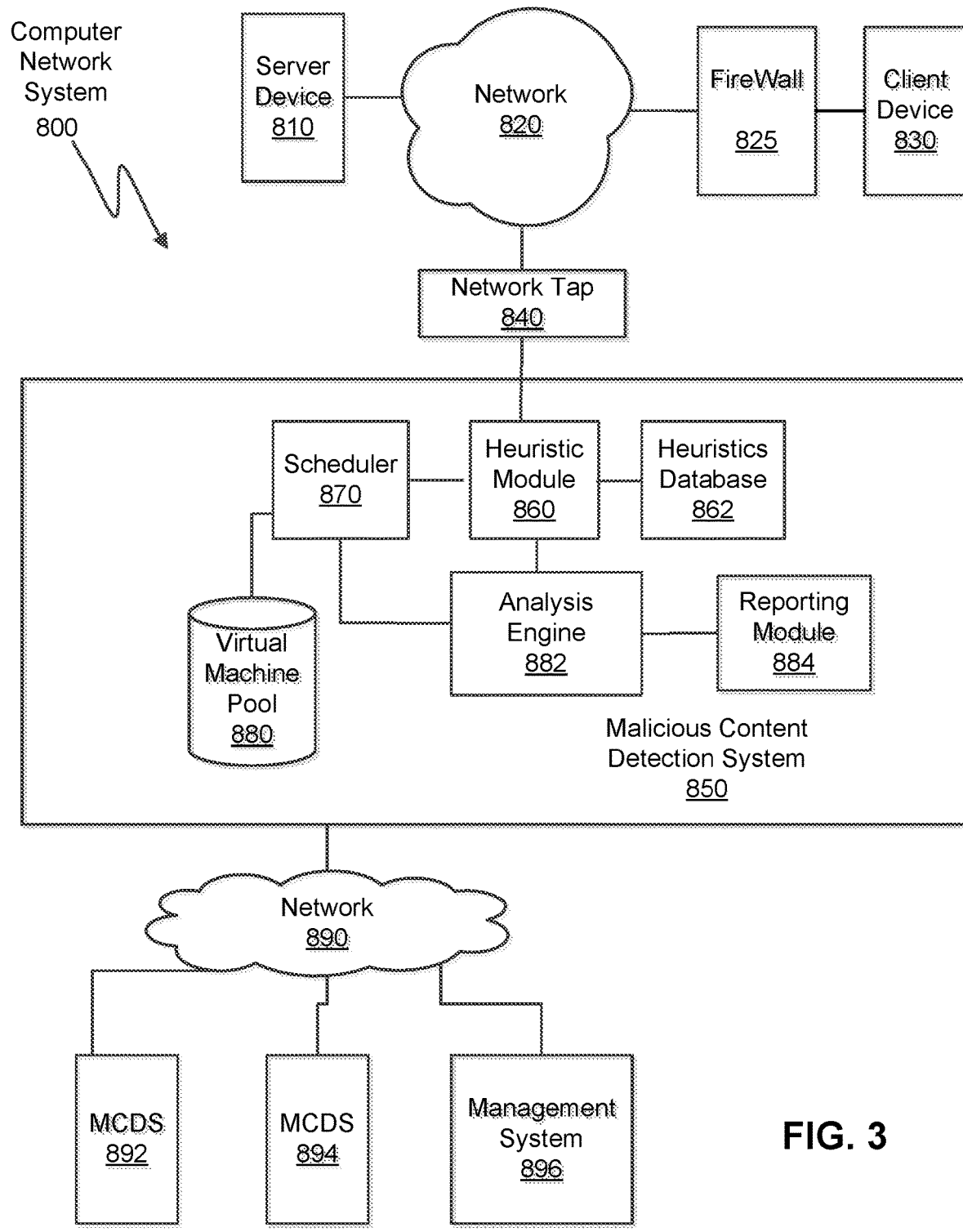
FIG. 3 is a block diagram of a computer network system deploying a malicious content detection system according to one embodiment of the invention.

FIG. 3 is a block diagram of an illustrative computer network system 800 having a malicious content detection system 850 in accordance with a further illustrative embodiment. The malicious content detection system 850 may represent any of the malicious content detection systems described above, such as, for example, detection system 100 of FIG. 1. The malicious content detection system 850 is illustrated with a server device 810 and a client device 830, each coupled for communication via a communication network 820. In various embodiments, there may be multiple server devices and multiple client devices sending and receiving data to/from each other, and the same device can serve as either a server or a client in separate communication sessions. Although FIG. 3 depicts data transmitted from the server device 810 to the client device 830, either device can transmit and receive data from the other.

Note that throughout this application, network content is utilized as an example of content for malicious content detection purposes; however, other types of content can also be applied. Network content may include any data transmitted over a network (i.e., network data). Network data may include text, software, images, audio, or other digital data. An example of network content includes web content, or any network data that may be transmitted using a Hypertext Transfer Protocol (HTTP), Hypertext Markup Language (HTML) protocol, or be transmitted in a manner suitable for display on a Web browser software application. Another example of network content includes email messages, which may be transmitted using an email protocol such as Simple Mail Transfer Protocol (SMTP), Post Office Protocol version 3 (POP3), or Internet Message Access Protocol (IMAP4). A further example of network content includes Instant Messages, which may be transmitted using an Instant Messaging protocol such as Session Initiation Protocol (SIP) or Extensible Messaging and Presence Protocol (XMPP). In addition, network content may include any network data that is transferred using other data transfer protocols, such as File Transfer Protocol (FTP).

The malicious network content detection system 850 may monitor exchanges of network content (e.g., Web content) in real-time rather than intercepting and holding the network content until such time as it can determine whether the network content includes malicious network content. The malicious network content detection system 825 may be configured to inspect exchanges of network content over the communication network 820, identify suspicious network content, and analyze the suspicious network content using a virtual machine to detect malicious network content. In this way, the malicious network content detection system 850 may be computationally efficient and scalable as data traffic volume and the number of computing devices communicating over the communication network 820 increase. Therefore, the malicious network content detection system 825 may not become a bottleneck in the computer network system 800.

The communication network 820 may include a public computer network such as the Internet, in which case a firewall 825 may be interposed between the communication network 820 and the client device 830. Alternatively, the communication network may be a private computer network such as a wireless telecommunication network, wide area network, or local area network, or a combination of networks. Though the communication network 820 may include any type of network and be used to communicate different types of data, communications of web data may be discussed below for purposes of example.

The malicious network content detection system 825 is shown as coupled with the network 820 by a network tap 840 (e.g., a data/packet capturing device). The network tap 840 may include a digital network tap configured to monitor network data and provide a copy of the network data to the malicious network content detection system 825. Network data may comprise signals and data that are transmitted over the communication network 820 including data flows from the server device 810 to the client device 830. In one example, the network tap 840 monitors and copies the network data without an appreciable decline in performance of the server device 810, the client device 830, or the communication network 820. The network tap 840 may copy any portion of the network data, for example, any number of data packets from the network data. In embodiments where the malicious content detection system 850 is implemented as a dedicated appliance or a dedicated computer system, the network tap 840 may include an assembly integrated into the appliance or computer system that includes network ports, network interface card and related logic (not shown) for connecting to the communication network 860 to non-disruptively "tap" traffic thereon and provide a copy of the traffic to the heuristic module 850. In other embodiments, the network tap 840 can be integrated into a firewall, router, switch or other network device (not shown) or can be a standalone component, such as an appropriate commercially available network tap. In virtual environments, a virtual tap (vTAP) can be used to copy traffic from virtual networks.

The network tap 840 may also capture metadata from the network data. The metadata may be associated with the server device 810 and/or the client device 830. For example, the metadata may identify the server device 810 and/or the client device 830. In some embodiments, the server device 810 transmits metadata which is captured by the tap 815. In other embodiments, a heuristic module 860 (described herein) may determine the server device 810 and the client device 830 by analyzing data packets within the network data in order to generate the metadata. The term, "content," as used herein may be construed to include the intercepted network data and/or the metadata unless the context requires otherwise.

The malicious network content detection system 825 may include a heuristic module 860, a heuristics database 862, a scheduler 870, a virtual machine pool 880, an analysis engine 882 and a reporting module 884. In some embodiments, the network tap 840 may be contained within the malicious network content detection system 850.

The heuristic module 860 receives the copy of the network data from the network tap 840 and applies heuristics to the data to determine if the network data might contain suspicious network content. The heuristics applied by the heuristic module 860 may be based on data and/or rules stored in the heuristics database 862. The heuristic module 860 may examine the image of the captured content without executing or opening the captured content. For example, the heuristic module 860 may examine the metadata or attributes of the captured content and/or the code image (e.g., a binary image of an executable) to determine whether a certain portion of the captured content matches a predetermined pattern or signature that is associated with a particular type of malicious content. In one example, the heuristic module 860 flags network data as suspicious after applying a heuristic analysis. This detection process is also referred to as a static malicious content detection. The suspicious network data may then be provided to the scheduler 870. In some embodiments, the suspicious network data is provided directly to the scheduler 870 with or without buffering or organizing one or more data flows.

When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected (e.g., using deep packet inspection techniques) and multiple characteristics may be identified before proceeding to the next step. In some embodiments, the characteristic may be determined as a result of an analysis across multiple packets comprising the network content. A score related to a probability that the suspicious characteristic identified indicates malicious network content is determined.

The heuristic module 860 may also provide a priority level for the packet and/or the features present in the packet. The scheduler 870 may then load and configure a virtual machine from the virtual machine pool 880 in an order related to the priority level, and dispatch the virtual machine to the analysis engine 882 to process the suspicious network content.

The heuristic module 860 may provide the packet containing the suspicious network content to the scheduler 870, along with a list of the features present in the packet and the malicious probability scores associated with each of those features. Alternatively, the heuristic module 860 may provide a pointer to the packet containing the suspicious network content to the scheduler 870 such that the scheduler 870 may access the packet via a memory shared with the heuristic module 860. In another embodiment, the heuristic module 860 may provide identification information regarding the packet to the scheduler 870 such that the scheduler 870, replayer 805, or virtual machine may query the heuristic module 860 for data regarding the packet as needed.

The scheduler 870 may identify the client device 830 and retrieve a virtual machine associated with the client device 830. A virtual machine may itself be executable software that is configured to mimic the performance of a device (e.g., the client device 830). The virtual machine may be retrieved from the virtual machine pool 880. Furthermore, the scheduler 870 may identify, for example, a Web browser running on the client device 830, and retrieve a virtual machine associated with the web browser.

In some embodiments, the heuristic module 860 transmits the metadata identifying the client device 830 to the scheduler 870. In other embodiments, the scheduler 870 receives one or more data packets of the network data from the heuristic module 860 and analyzes the one or more data packets to identify the client device 830. In yet other embodiments, the metadata may be received from the network tap 840.

The scheduler 870 may retrieve and configure the virtual machine to mimic the pertinent performance characteristics of the client device 830. In one example, the scheduler 870 configures the characteristics of the virtual machine to mimic only those features of the client device 830 that are affected by the network data copied by the network tap 840. The scheduler 870 may determine the features of the client device 830 that are affected by the network data by receiving and analyzing the network data from the network tap 840. Such features of the client device 830 may include ports that are to receive the network data, select device drivers that are to respond to the network data, and any other devices coupled to or contained within the client device 830 that can respond to the network data. In other embodiments, the heuristic module 860 may determine the features of the client device 830 that are affected by the network data by receiving and analyzing the network data from the network tap 840. The heuristic module 850 may then transmit the features of the client device to the scheduler 870.

The virtual machine pool 880 may be configured to store one or more virtual machines. The virtual machine pool 880 may include software and/or a storage medium capable of storing software. In one example, the virtual machine pool 880 stores a single virtual machine that can be configured by the scheduler 870 to mimic the performance of any client device 830 on the communication network 820. The virtual machine pool 880 may store any number of distinct virtual machines that can be configured to simulate the performance of a wide variety of client devices 830. The virtual machine (s) may be executed along with a plurality of versions of a software application for dynamic testing of network content, as described hereinabove.

The analysis engine 882 simulates the receipt and/or display of the network content from the server device 810 after the network content is received by the client device 110 to analyze the effects of the network content upon the client device 830. The analysis engine 882 may identify the effects of malware or malicious network content by analyzing the simulation of the effects of the network content upon the client device 830 that is carried out on the virtual machine. There may be multiple analysis engines 850 to simulate multiple streams of network content. The analysis engine 882 may be configured to monitor the virtual machine for indications that the suspicious network content is in fact malicious network content. Such indications may include unusual network transmissions, unusual changes in performance, and the like. This detection process is referred to as a dynamic malicious content detection.

The analysis engine 882 may flag the suspicious network content as malicious network content according to the observed behavior of the virtual machine. The reporting module 884 may issue alerts indicating the presence of malware, and using pointers and other reference information, identify the packets of the network content containing the malware. Additionally, the server device 810 may be added to a list of malicious network content providers, and future network transmissions originating from the server device 810 may be blocked from reaching their intended destinations, e.g., by firewall 825.

The computer network system 800 may also include a further communication network 890, which couples the malicious content detection system (MCDS) 850 with one or more other MCDS, of which MCDS 892 and MCDS 894 are shown, and a management system 896, which may be implemented as a Web server having a Web interface. The communication network 890 may, in some embodiments, be coupled for communication with or part of network 820. The management system 896 is responsible for managing the MCDS 850, 892, 894 and providing updates to their operation systems and software programs. Also, the management system 896 may cause malware signatures generated by any of the MCDS 850, 892, 894 to be shared with one or more of the other MCDS 850, 892, 894, for example, on a subscription basis. Moreover, the malicious content detection system as described in the foregoing embodiments may be incorporated into one or more of the MCDS 850, 892, 894, or into all of them, depending on the deployment. Also, the management system 896 itself or another dedicated computer station may incorporate the malicious content detection system in deployments where such detection is to be conducted at a centralized resource.

Further information regarding an embodiment of a malicious content detection system can be had with reference to U.S. Pat. No. 8,171,553, the disclosure of which being incorporated herein by reference in its entirety.

As described above, the detection or analysis performed by the heuristic module 860 may be referred to as static detection or static analysis, which may generate a first score (e.g., a static detection score) according to a first scoring scheme or algorithm. The detection or analysis performed by the analysis engine 882 is referred to as dynamic detection or dynamic analysis, which may generate a second score (e.g., a dynamic detection score) according to a second scoring scheme or algorithm. The first and second scores may be combined, according to a predetermined algorithm, to derive a final score indicating the probability that a malicious content suspect is indeed malicious.

Furthermore, detection systems 850 and 892-894 may deployed in a variety of distribution ways. For example, detection system 850 may be deployed as a detection appliance at a client site to detect any suspicious content, for example, at a local area network (LAN) of the client. In addition, any of MCDS 892 and MCDS 894 may also be deployed as dedicated data analysis systems. Systems 850 and 892-894 may be configured and managed by a management system 896 over network 890, which may be a LAN, a wide area network (WAN) such as the Internet, or a combination of both. Management system 896 may be implemented as a Web server having a Web interface to allow an administrator of a client (e.g., corporation entity) to log in to manage detection systems 850 and 892-894. For example, an administrator may able to activate or deactivate certain functionalities of malicious content detection systems 850 and 892-894 or alternatively, to distribute software updates such as malicious content definition files (e.g., malicious signatures or patterns) or rules, etc. Furthermore, a user can submit via a Web interface suspicious content to be analyzed, for example, by dedicated data analysis systems 892-894. As described above, malicious content detection includes static detection and dynamic detection. Such static and dynamic detections can be distributed amongst different systems over a network. For example, static detection may be performed by detection system 850 at a client site, while dynamic detection of the same content can be offloaded to the cloud, for example, by any of detection systems 892-894. Other configurations may exist.

FIG. 4 is a block diagram illustrating an example of a data processing system which may be used with one embodiment of the invention. For example, system 900 may represents any of data processing systems described above performing any of the processes or methods described above. System 900 may represent a desktop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 4, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 4 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for detecting malicious content, comprising:
installing a plurality of versions of a software application with an operating system operating as part of a virtual machine, each of the plurality of versions of the software application being different from each other;
registering, in an operating system registry, each of the plurality of versions of the software application with the operating system of the virtual machine, each of the plurality of versions of the software application being registered within the operating system registry either (i) under a different identifier or name within a shared directory or (ii) under a common identifier within different directories;
determining a software profile suitable for testing a potentially malicious content suspect, the software profile comprises a version or versions of the operating system and a version or versions of the software application from the plurality of versions of the software application;
concurrently processing at least two versions of the software application from the plurality versions of the software application associated with the determined software profile, registered within the operating system registry, to access the potentially malicious content suspect within the virtual machine, without switching to another virtual machine different from the virtual machine; and
concurrently monitoring behaviors of the potentially malicious content suspect during processing by the at least two versions of the software application to detect behaviors associated with a malicious attack.

2. The method of claim 1 further comprising:
storing information associated with each detected behavior of the detected behaviors that is associated with a malicious attack along with information identifying a version of the software application of the plurality of versions of the software application that is operating during an occurrence of the detected behavior; and
issuing an alert with respect to the malicious attack.

3. The method of claim 1 further comprising:
maintaining a persistent communication channel for monitoring events, the events being behaviors of the potentially malicious content suspect during processing by the at least two versions of the software application to detect behaviors associated with a malicious attack; and
storing information associated with each of the events as part of an event log, the information identifying an event of the events triggered by the potentially malicious content suspect.

4. The method of claim 3, wherein the events include a file creation or a file open event.

5. The method of claim 3 further comprising:
analyzing the stored information associated with each of the events based on a set of rules or policies to determine a likelihood of the potentially malicious content suspect being malicious.

6. The method of claim 1, wherein the installing of the plurality of versions of the software application further comprises installing a first software application version of the plurality of versions of the software application in a first directory and installing a second software application version of the plurality of versions of the software application in a second directory separate from and different than the first directory.

7. The method of claim 1, wherein the installing of the plurality of versions of the software application further comprises installing each of the plurality of versions of the software application in an identical directory with each of the plurality of versions of the software application being assigned a different identifier and being registered with the operating system of the virtual machine.

8. The method of claim 1, wherein the processing of the at least two versions of the software application comprises processing each software application version of the at least two versions of the software application concurrently by at least concurrently launching each software application version of the at least two versions of the software application within the virtual machine in response to providing an identifier identifying the potentially malicious content suspect to allow each of the launched software application versions to process the potentially malicious content suspect.

9. The method of claim 1 further comprising:
based on information associated with the potentially malicious content suspect, selecting, by a scheduler, the virtual machine from a virtual machine pool that has been configured to mimic a target operating environment of at least one malicious content suspect; and
scheduling, by the scheduler, the selected virtual machine to be launched within the data processing system.

10. The method of claim 1, wherein the alert comprises an identifier of at least one software application version of the plurality of versions of the software application with the detected behaviors associated with a malicious attack.

11. The method of claim 1, wherein the plurality of versions of the software application are tested in processing the potentially malicious content suspect within the virtual machine without terminating and launching the virtual machine for each software application version for the plurality of versions of the software application.

12. The method of claim 1, wherein the determining of the software profile suitable for testing the potentially malicious content suspect is based on an analysis of protocol information associated with the potentially malicious content suspect.

13. A malicious content detection system, comprising:
a processor; and
a memory coupled to the processor, the memory to store instructions, including instructions that, when executed, cause the processor to
register each of a plurality of versions of a software application with an operating system operating as part of a virtual machine, each of the plurality of versions of the software application being different from each other and being registered within a registry either (i) under a different identifier or name within a shared directory or (ii) under a common identifier within different directories,
determine a software profile suitable for testing a potentially malicious content suspect, the software profile comprises a version or versions of the operating system and a version or versions of the software application,
concurrently process at least two versions of the software application from the plurality of versions of the software application associated with the determined software profile, currently registered with the operating system, to access the potentially malicious content suspect within the virtual machine, without switching to another virtual machine different from the virtual machine,
concurrently monitor behaviors of the potentially malicious content suspect during processing by each software application version of the at least two versions of the software application to detect one or more behaviors associated with a malicious attack, and
store both information associated with each detected behavior of the one or more detected behaviors and information identifying a software application version of the at least two versions of the software application that is operating during an occurrence of the detected behavior.

14. The malicious content detection system of claim 13, wherein the memory to further store instructions that, when executed, cause the processor to:
install the plurality of versions of the software application concurrently to coexist with the operating system operating as part of the virtual machine by at least installing a unique directory path corresponding to each software application version of the plurality of versions of the software application; and
issue an alert in response to detecting the malicious attack.

15. The malicious content detection system of claim 13, wherein the processor is to process the at least two versions of the software application by at least sequentially launching one or more software application versions of the plurality of versions of the software application within the virtual machine in response to providing an identifier identifying the potentially malicious content suspect to allow the launched version of the one or more software applications to process the potentially malicious content suspect.

16. The malicious content detection system of claim 13, wherein the plurality of versions of the software application are tested in processing the potentially malicious content suspect within the virtual machine, without having to schedule, launch, and terminate the virtual machine for each software application version for the plurality of versions of the software application.

17. The malicious content detection system of claim 13, wherein the memory to store instructions that, when executed, cause the processor to determine the software profile based on an analysis of protocol information associated with the potentially malicious content suspect.

18. A non-transitory computer readable medium including software that, during execution, performs operations, comprising:
registering, within a registry of an operating system, each of a plurality of versions of the software application of the virtual machine, each of the plurality of versions of the software application being registered within the registry either (i) under a different identifier or name within a shared directory or (ii) under a common identifier within different directories;
determining a software profile suitable for testing a potentially malicious content suspect, the software profile comprises a version or versions of the operating system and a version or versions of the software application from the plurality of versions of the software application;
concurrently processing at least two versions of the software application from the plurality versions of the software application, while registered within the registry of the operating system, to access the potentially malicious content suspect within the virtual machine, without switching to another virtual machine different from the virtual machine;
concurrently monitoring behaviors of the potentially malicious content suspect during processing by each software application version of the at least two versions of the software application to detect one or more behaviors associated with a malicious attack; and
storing both information associated with each detected behavior of the one or more detected behaviors and information identifying a software application version of the at least two versions of the software application that is operating during an occurrence of the detected behavior.

19. The non-transitory computer readable medium of claim 18, wherein the software is configured to perform additional operations comprising:
issuing an alert with respect to the malicious attack.

20. The non-transitory computer readable medium of claim 18, wherein the software is configured to perform additional operations comprising:
installing of the plurality of versions of the software application by at least (1) installing a first software application version of the plurality of versions of the software application in a first directory and installing a second software application version of the plurality of versions of the software application in a second directory separate from and different than the first directory or (2) installing each of the plurality of versions of the software application in an identical directory with each of the plurality of versions of the software application being assigned a different identifier and being registered with the operating system of the virtual machine.

21. The non-transitory computer readable medium of claim 18, wherein the processing of the at least two versions of the software application comprises processing each software application version of the at least two versions of the software application concurrently by at least concurrently launching each software application version of the at least two versions of the software application within the virtual machine in response to providing an identifier identifying the potentially malicious content suspect to allow each of the launched software application versions to process the potentially malicious content suspect.

22. The non-transitory computer readable medium of claim 18, wherein the determining of the software profile suitable for testing a potentially malicious content suspect is based on an analysis of protocol information associated with the potentially malicious content suspect.

\* \* \* \* \*